3,073,973
CIRCUIT ARRANGEMENTS FOR THE DAMPING OF EXCESS VOLTAGES IN SHOCK POTENTIAL GENERATORS

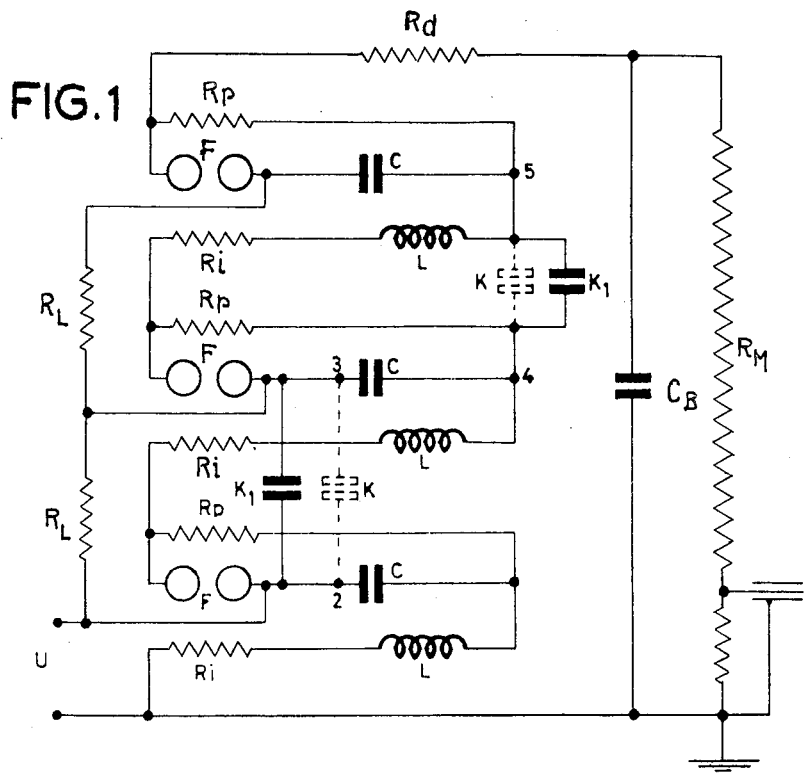
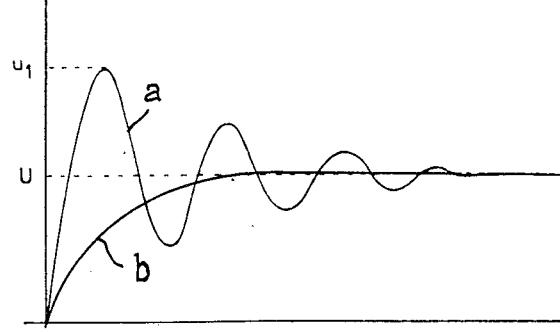
INVENTOR
ARNOLD RODEWALD

Arnold Rodewald, Basel, Switzerland, assignor to Emil Haefely & Cie A.G.
Filed July 5, 1960, Ser. No. 40,854
Claims priority, application Switzerland Mar. 4, 1960
7 Claims. (Cl. 307—110)

Shock or impulse electrical generators for high voltages are mostly constructed nowadays according to the voltage multiplier circuit arrangement proposed by Marx. The characteristic feature of this circuit arrangement is that a plurality of condensers are charged up to a specific voltage and then suddenly connected in series through spark gaps. The sum of the component voltages then produces the actual impulse potential. As the voltage in relation to ground increases along the series-connected condensers, it is an obvious measure in the constructional design of the circuit arrangement to arrange the individual capacitors vertically one above the other circuit elemets for the production of the wave form.

For various reasons it is advantageous to keep this construction as compact as possible, especially in installations for the production of high voltages of great power. Primarily the height of the impulse generator has been dependent upon the height of the high tension test chamber. Therefore, for constructional reasons, great importance is attached to a shock installation which is as low as possible. Furthermore certain considerations exist regarding the form of the voltage wave emitted by the impulse generator, according to which considerations the high frequency oscillations, which may be superimposed upon the voltage wave should not exceed certain limits. This means that the total inductance of the discharge circuit must be kept as low as possible, which is equivalent to the requirement for a small spatial extent of the high-tension installation.

In the operation of an impulse generator excess voltages of considerable magnitude occur between the individual stages. On account of these excess voltages, the insulation distances must be made greater than would be necessary for the production of the actual shock voltage wave. In accordance with the invention these excess voltages can be reduced by the provision of additional condensers in parallel with the stray capacities between the generator stages necessitated by the construction.

An example of embodiment of the invention is hereinafter described with reference to the accompanying drawing, in which:

FIG. 1 is a diagram of a three-stage impulse generator, and

FIG. 2 is a voltage diagram.

Each stage of the impulse generator according to FIG. 1 comprises an impulse condenser C, a spark gap F, a damping resistance $R_i$, a parallel resistance $R_p$ and finally a certain inductance L. Charging resistance $R_L$ are provided between the individual stages for charging the generator. K represents stray capacity between the generator stages. The external shock circuit is formed by the damping resistance $R_d$ and a loading capacitance $C_B$. A voltage divider $R_M$ is connected in parallel with this loading capacitance. $K_1$ are additional condensers provided for damping the excess voltages.

After the charging of the impulse condensers C with the direct current voltage U, the points 2 and 3 in FIG. 1, which are situated in spaced relation one above the other respectively in the first and second generator stages, possess the same potential. The voltage U can be measured from both points to ground. The stray capacity K between the two generator stages is thus free from charge.

The assumed concentration of the stray capacity at K between the points 2 and 3 is arbitrary; it could for example be assumed as on the ground side of the condensers C, between the points 5 and 4.

If now the potential across the switch spark gap F collapses during the striking operation of the generator, the stray capacity K is charged up to the voltage U, through the internal series resistance $R_i$, because the impulse condensers C possess a very much greater capacitance than the stray capacity K. The internal series resistance $R_i$, the impulse condensers C and also the current loop each contain inductance, which can be assumed to be combined in the inductance L. On account of the presence of this inductance, the small magnitude of the stray capacitance and the relatively small internal series resistance necessary for the production of a standard wave form, an oscillatory charging of the stray capacity K takes place. The maximum value of the oscillation amplitude amounts to nearly 2U (see curve $a$ in FIG. 2). The insulation distance between two generator stages is thus subjected not only to the voltage U, but to the much higher voltage $u_1$. Similar conditions occur in the striking of the other switch spark gaps between the other stages of the generator. The possibility of damping this oscillation by increasing the internal series resistance is not resorted to because, as already indicated above, it is not feasible to produce a standard voltage wave with the generator.

In accordance with the present invention, the excess oscillation is reduced by connecting additional condensers $K_1$ in parallel with the stray capacity K, for with predetermined fixed inductance and fixed resistance it is possible to make the periodic transient phenomenon in a series oscillation circuit aperiodic by increasing the capacitance. Curve $b$ in FIG. 2 shows the voltage characteristic between the generator stages, as damped by the condensers $K_1$, the insulation being therefore only subjected to voltage U.

It is usual in the operation of an impulse generator to use a so-called basic loading in the form of a separate external capacitance. Thus it is possible to produce a standard wave form even when the generator is idle or when testing objects with a very small capacitance. As a result of the additional condensers distributed in accordance with the invention along the entire impulse generator for the reduction of the excess voltages, this external basic loading now becomes entirely or partially superflous, since these condensers similarly present a load for the generator.

What I claim is:

1. An impulse generator comprising a plurality of vertically superimposed stages connected in cascade, each stage comprising in combination, a damping resistor, an impulse capacitor and a spark gap in series connection and having inherent inductance, an additional resistor bridging said spark gap and said damping resistor, an electrical conductor connected intermediate said capacitor and said spark gap and leading to a terminal for connection to one pole of a direct current voltage source, directly in the case of the first stage and via a charging resistor in the case of subsequent stages, an electrical conductor leading from the damping resistor of the first stage to the other pole of said direct current voltage source, said impulse generator having stray capacitance between stages forming with said inherent inductance a series oscillation circuit capable of building up excess transient voltages of considerable magnitude between said superimposed stages, and additional capacitance provided in parallel with said stray capacitance to reduce said excess voltages.

2. An impulse generator according to claim 1, wherein said additional capacitance is connected between two consecutive stages intermediate the spark gaps and the impulse condensers.

3. An impulse generator according to claim 1, wherein said additional capacitance is connected between two consecutive stages intermediate the damping resistance and the impulse condensers.

4. A multi-stage impulse generator, each stage comprising a damping resistance, an impulse condenser and a spark gap in series connection and having inherent inductance, an electrical conductor connected intermediate said condenser and said spark gap and leading to a terminal for connection to one pole of a direct current voltage source, an electrical conductor leading from said damping resistance to the other pole of said direct current voltage source, said impulse generator having stray capacitance between stages of markedly lower magnitude than that of said impulse condensers and forming with said inherent inductance a series oscillation circuit having a periodic transient characteristic, and additional capacitance provided between each stage to damp out the oscillatory charging of said stray capacitance.

5. An impulse generator according to claim 1, wherein the output of the generator is connected via a damping resistance to a loading capacitor and a voltage divider connected in parallel with one another, and wherein said additional capacitances serve as part of the basic loading for said generator.

6. An impulse generator comprising a plurality of stages connected in cascade, each stage comprising, in combination, a damping resistor, an impulse capacitor and a spark gap in series connection and having inherent inductance, means for applying a D.C. potential to said stages in parallel with each other to charge the capacitors thereof, said impulse generator having stray capacitance between stages and forming, with said inherent inductance, a series oscillation circuit capable of building up, between stages, transient voltages of a value substantially in excess of said potentional, said transient voltages having a periodic characteristic, and additional capacitance provided between the stages in parallel with said stray capacitance to render said transient characteristic aperiodic.

7. A multi-stage impulse generator as claimed in claim 6, in which said additional capacitance provides the basic loading for the impulse generator.

References Cited in the file of this patent

UNITED STATES PATENTS

| | | |
|---|---|---|
| 1,997,064 | Lusignan | Apr. 9, 1935 |
| 2,064,630 | Rorden | Dec. 15, 1936 |